United States Patent [19]

Ward

[11] Patent Number: 4,717,764

[45] Date of Patent: Jan. 5, 1988

[54] TWO STAGE MELT POLYMERIZATION PROCESS FOR MAKING POLYMERS CONTAINING AROMATIC AMIDE GROUPS

[75] Inventor: Bennett C. Ward, Charlotte, N.C.

[73] Assignee: Celanese Corporation, New York, N.Y.

[21] Appl. No.: 780,709

[22] Filed: Sep. 26, 1985

Related U.S. Application Data

[63] Continuation-in-part of Ser. No. 704,227, Feb. 22, 1985, Pat. No. 4,672,104, and Ser. No. 645,952, Aug. 31, 1984, Pat. No. 4,588,808.

[51] Int. Cl.$^4$ .............................................. C08G 73/18
[52] U.S. Cl. ..................... 528/337; 528/340; 528/342; 528/348
[58] Field of Search ................ 528/340, 348, 342, 337

[56] References Cited

U.S. PATENT DOCUMENTS

| Re. 26,065 | 7/1966 | Marvel | 528/348 |
|---|---|---|---|
| 3,433,772 | 3/1969 | Chenevey | 528/342 |
| 3,839,296 | 10/1974 | Campbell | 528/348 |
| 3,901,854 | 8/1975 | Jones | 528/348 |
| 4,348,513 | 9/1982 | Keske | 528/348 |
| 4,385,170 | 5/1983 | Hirami | 528/340 |
| 4,588,808 | 5/1986 | Ward | 528/342 |
| 4,672,104 | 6/1987 | Ward | 528/342 |

Primary Examiner—C. Warren Ivy
Attorney, Agent, or Firm—Forrest D. Stine

[57] ABSTRACT

A two stage process for the production of benzimidazole/aromatic amide polymers and copolymers and wholly aromatic polyamides is provided wherein an aromatic amine component comprising an aromatic diamine or triamine and optionally, an aromatic tetraamine is reacted with an aromatic dicarboxylic acid and/or ester. The reactants are heated with agitation in a first stage to a temperature at least sufficient to initiate condensate evolution. The agitation is then discontinued and the reaction is allowed to proceed, in many cases with the formation of a foam while heating is continued. The reaction mass is then allowed to solidify by cooling and is crushed to a ground prepolymer which is heated with agitation in a second stage to a temperature higher than that of the first stage until the desired polymer is obtained. The invention also includes certain benzimidazole/aromatic amide polymers and copolymers as new compositions of matter.

14 Claims, No Drawings

TWO STAGE MELT POLYMERIZATION PROCESS FOR MAKING POLYMERS CONTAINING AROMATIC AMIDE GROUPS

This application is a continuation-in-part of copending applications Ser. No. 645,952 filed Aug. 31, 1984, now U.S. Pat. No. 4,588,808 and Ser. No. 704,227, filed Feb. 22, 1985, now U.S. Pat. No. 4,672,104.

BACKGROUND OF THE INVENTION

The present invention provides a two-stage melt polymerization process for the production of high molecular weight polymers containing aromatic amide groups and, optionally, benzimidazole groups in the polymer chain.

High molecular weight polybenzimidazoles are polymers of high thermal stability and excellent resistance to oxidative or hydrolytic degradation, which can be formed into shaped articles such as fibers and films having very desirable physical properties. As taught by the published literature, these polymers may be prepared, for example, by melt polymerizing an aromatic tetraamine and an aromatic or heterocyclic dicarboxylic acid, ester or anhydride in a one or two stage process; see, for example H. Vogel and C. S. Marvel, Journal of Polymer Science, Vol. L, pages 511–539 (1961); and U.S. Pat. Nos. Re.26,065; 3,174,947; 3,509,108; 3,551,389; 4,312,976; 3,433,772; and 3,655,632. In particular, U.S. Pat. No. 3,551,389 discloses a two stage process for the production of aromatic polybenzimidazoles, in which the monomers are heated at a temperature above 170° C. in a first stage melt polymerization zone until a foamed prepolymer is formed. The foamed prepolymer is cooled, pulverized, and introduced into a second stage polymerization zone where it is heated again to yield a polybenzimidazole polymer product.

In addition to the melt polymerization process described in the foregoing references, a process of preparing polybenzimidazoles has been proposed in which good results are reported to be obtained by means of the solution polymerization of an inorganic acid salt of an aromatic tetraamine and a dicarboxylic acid or a derivative thereof such as the dimethyl ester with heat in the presence of polyphosphoric acid; (see U.S. Pat. No. 3,313,783 and Iwakura et al, Journal of Polymer Science: Part A, Vol. 2, pages 2605–2515 [1964]). According to this process, the polymer product after completion of the reaction can be separated by pouring the reaction mixture in the form of a polyphosphoric acid solution into a large quantity of water. However, this separation procedure is complicated and, moreover, it is difficult to recover and reuse the polyphosphoric acid.

Copending application Ser. No. 645,952, filed Aug. 31, 1984, which is one of the parents of this application, discloses and claims a two stage process for the production of polybenzimidazoles using a free dicarboxylic acid as the dicarboxylic monomer component. Copending application Ser. No. 704,227, filed Feb. 22, 1985 which is the other parent of this application, discloses and claims a two stage process for the production of polybenzimidoles by reacting an aromatic tetraamine and a dicarboxylic component wherein no more than 95% of the carboxylate groups are the free acid or phenyl ester.

While the foregoing processes may be used to produce polybenzimidazoles of generally satisfactory properties, they require a full stoichiometric amount of a tetraamine such as 3,3′,4,4′-tetraaminobiphenyl which is expensive to produce and thus raises the cost of the final polymer. Furthermore, there exist end-uses for polybenzimidazoles where, in addition to its excellent high temperature and comfort properties, some improvement in mechanical properties such as stiffness and tenacity would be highly desirable. In view of these factors, any expedient in the production of polybenzimidazoles which would have the effect of reducing the quantity of aromatic tetraamine necessary for such production and/or improve the mechanical properties of the polymer without undue sacrifice of its thermal or other desirable properties would be very beneficial.

Another class of polymers known in the art having a desirable spectrum of properties are the substantially wholly aromatic polyamides, i.e. the so-called aramids produced by condensing an aromatic diamine or derivative with an aromatic dicarboxylic acid or derivative. Some typical members of this class of polymers are disclosed, for example, in U.S. Pat. Nos. 3,063,966 of Kwolek et al and 3,094,511 of Hill et al, the entire disclosures of which are incorporated by reference. In particular, these polyamides have excellent mechanical properties, e.g. high tenacity and modulus, particularly at relatively high temperatures due to their comparatively high melting points. However, these polymers have been difficult and expensive to prepare, generally requiring the condensation of the diacid halide of the aromatic dicarboxylic acid with the aromatic diamine in a suitable solvent or emulsifying or dispersing medium. The disadvantages of this method are that it requires the use of the highly active and difficult to handle diacid halide and involves the necessity of separating the polymer from the solvent, emulsifying or dispension medium. Thus, any method for the preparation of these polymers which can be carried out with the relatively easy to handle free aromatic dicarboxylic acid or ester of such acid in a melt polymerization process not requiring the use of a major amount of solvent or emulsifying or dispersing medium would be very useful.

SUMMARY OF THE INVENTION

In accordance with one aspect of this invention, benzimidazole-aromatic amide polymers and copolymers, or substantially wholly aromatic polyamides are prepared by reacting in a two stage polymerization process at least one aromatic amine component which may be at least one member of the group consisting of aromatic diamines and aromatic triamines, and an aromatic dicarboxylic component which may be the free acid or an ester thereof, all more specifically defined hereinafter. Part of the aromatic diamine and/or aromatic triamine may be replaced by an aromatic tetraamine also more specifically defined hereinafter. Certain of the polymers prepared using the foregoing combinations of monomers are new compositions of matter.

In the first stage of the process, the mixture of aromatic amine component and aromatic dicarboxylic component and, if desired, a polymerization catalyst is heated with agitation to condensation polymerization temperatures which are generally above the melting point of the highest boiling aromatic amine in the mixture. Depending on the nature and melting point of the compound or compounds making up the aromatic dicarboxylic component, the resulting polymerizing mass is a liquid which may be a slurry of solid acid particles in melted aromatic amine, a homogeneous mixture of aromatic amine and dicarboxylic component and/or an emulsion comprising melted aromatic amine and melted dicarboxylic component. The heating is continued to maintain a condensing polymerization temperature between 230° C.–350° C. with concurrent agitation. When a free acid is used as at least part of the aromatic dicarboxylic component, agitation may be continued, for example, until the viscosity of the mixture rises to a point such that the agitator torque is above about 1.5 times, and generally no higher than about 10 times, the torque before the increase in viscosity begins to occur. The agitation is then terminated, and heating is continued until the inherent viscosity of the polymerizing mass reaches between 0.05–0.40 dl/g. measured in concentrated sulfuric acid. In many cases, although not all, the mass tends to foam to a friable mass. The resulting prepolymer is then cooled to solidify it and ground to a powder which is heated in the solid state preferably with agitation in a second polymerization stage at a higher temperature than the first stage until the desired degree of polymerization is achieved.

Depending on the choice and quantity of monomers, the process of this invention may be used to produce benzimidazole aromatic amide polymers and copolymers having varying proportions of benzimidazole and aromatic amide units in the polymer chain or substantially wholly aromatic polyamides. The process thus provides means for obtaining varying combinations of the known desirable properties of polybenzimidazoles and wholly aromatic polyamides in a single polymer. The process also provides an expedient for reducing the amount of aromatic tetraamine in the production of polybenzimidazoles without an undue sacrifice of the desirable thermal properties of these polymers.

DETAILED DESCRIPTION OF THE INVENTION

The aromatic diamines contemplated under this invention have the formula:

wherein Ar is a divalent aromatic radical in which non-adjacent carbon atoms are bonded to the amine groups. Examples of such radicals are m- and p-phenylene; biphenylene in which the amine groups are attached to ring carbon atoms in each of the two rings which are non-adjacent to the carbon atoms linking the two rings, e.g. 3,3'biphenylene and 4,4'-biphenylene; naphthylene radicals, e.g. 2,6-naphthylene and 2,7-naphthylene; radicals having the formula:

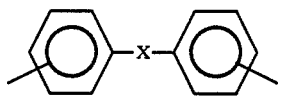

where X represents —O—, —S—, —SO$_2$—, —C— or a lower alkylene group, such as —CH$_2$—, —(CH$_2$)$_2$—, or —C(CH$_3$)$_2$, and the ring carbon atoms bonded to the amine groups are non-adjacent to the ring carbon atoms bonded to the "X" groups. Any of the hydrogen atoms bonded to ring carbon atoms in the foregoing radicals may be substituted with radicals inert to the conditions of reaction, e.g. lower alkyl or alkoxy, e.g. containing up to four carbon atoms, halogen, sulfonyl or nitro, with the number of carbon atoms in the substituent groups not exceeding nine.

Exemplary diamines which may be utilized in this invention include meta-phenylene diamine and lower alkyl substituted meta-phenylene diamines such as methyl-, ethyl-, propyl-, etc., meta-phenylene diamine; dimethyl, trimethyl, tetramethyl, diethyl, triethyl, and triisopropyl meta-phenylene diamine; 2-methyl-4-ethyl meta-phenylene diamine and 2-methyl-4-ethyl-5-propyl meta-phenylene diamine; methoxy-, ethoxy-, propoxy-, and butoxy-, meta-phenylene diamine; dimethoxy, trimethoxy, tetramethoxy, and diethoxy meta-phenylene diamine; 2-methoxy-4-ethoxy meta-phenylene diamine; halogen-substituted meta-phenylene diamine as exemplified by chloro, bromo, and fluoro meta-phenylene diamine; and nitro meta-phenylene diamines.

In addition to meta-phenylene diamine and substituted meta-phenylene diamines specified above, the corresponding unsubstituted and substituted para-phenylene diamine compounds may also be used. There may be one or more or a combination of substituents attached to the aromatic ring so long as the total number of carbon atoms in all substituents attached to an aromatic ring does not exceed nine.

In addition to the single ring aromatic diamines specified above, multiple or fused ring aromatic diamines in which the amino groups are oriented meta or para with respect to each other are also useful in this invention. Exemplary of such compounds are 4,4'-diphenyldiamine (benzidine), 3,3'-oxydiphenyldiamine, 3,3'-sulfonyldiphenyldiamine, 3,3'-diphenyldiamine, 2,6-diaminonaphthalene and 1,5-diaminonaphthalene and the corresponding compounds in which one or both of the aromatic rings contains one or more or a combination of lower alkyl, lower alkoxy, halogen, nitro, and sulfonyl, groups and the total number of carbon atoms in the substituent groups attached to an aromatic ring does not exceed nine.

The aromatic triamines contemplated by this invention have the formula:

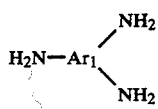

wherein Ar$_1$ is a trivalent aromatic radical having any of the foregoing ring structures identified as suitable for the previously defined divalent Ar but with two adjacent ring carbon atoms bonded to amine groups and a third ring carbon atom bonded to an amine group non-adjacent to each of the other ring carbon atoms bonded to amine groups. The hydrogen atoms bonded to ring carbon atoms of the trivalent Ar$_1$ radical may be replaced with the same substituent groups specified above for the Ar radical as long as the total number of carbon atoms in the substituent groups of each aromatic ring does not exceed nine. When the structure of Ar$_1$ contains more than one linked aromatic ring, it is preferable that the amine groups on adjacent carbon atoms occur on a different ring than the amine groups bonded to a non-adjacent carbon atom. Moreover, in the case of linked multiring structures, e.g. biphenyl derivatives, it is preferable that all the ring carbon atoms bonded to amine groups are non-adjacent to the carbon atoms linked to carbon atoms of other rings.

Examples of aromatic triamines which may be used are 3,4,4'-triaminobiphenyl (TRI), 3,4,3'triaminobiphenyl, 1,2,4,-triaminobenzene, 1,2,5-triaminonaphthalene, 1,2,6-triaminonaphthalene, 2,3,6-triaminonaphthalene, 2,3,7-triaminonaphthalene, 3,4,4'-triamiodiphenyl methane, 3,4,4'-triaminodiphenyl ethane, 3,4,4'-triaminodiphenyl-2,2-propane, 3,4,4'-triaminodiphenyl thioether and 3,4,4'-triaminodiphenyl sulfone. The preferred aromatic triamine is 3,4,4'-triaminobiphenyl.

The aromatic tetramines contemplated as an optional monomer in forming the polymers of this invention have the formula:

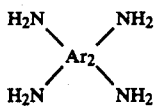

wherein $Ar_2$ is a tetravalent aromatic radical having any of the ring structures identified as suitable for the previously define Ar and $Ar_1$ but with two pairs of adjacent ring carbon atoms bonded to amine groups and the carbon atoms of each pair being non-adjacent to those of the other pair. Again, the hydrogen atoms bonded to any of the ring carbon atoms may be replaced with the same substituent groups specified above in the description of Ar and $Ar_1$ as long as the number of carbon atoms in the substituent groups of each aromatic ring does not exceed nine. As is the case with Ar and $Ar_1$ it is preferred when $Ar_2$ is a multi-ring structure with linked aromatic rings, e.g. biphenyl, that the ring carbon atoms bonded to amine groups not be adjacent to the linked carbon atoms.

Among the aromatic tetraamines suitable for the process may be mentioned, for example, 3,3',4,4'-tetraaminobiphenyl; 1,2,4,5-tetraaminobenzene; 1,2,5,6-tetraaminonaphthalene; 2,3,6,7-tetraaminonaphthalene; 3,3',4,4'-tetraaminodiphenyl methan; 3,3',4,4'tetraaminodiphenyl ethane; 3,3',4,4'-tetraaminodiphenyl-2,2-propane; 3,3',4,4'-tetraaminodiphenyl thioether; and 3,3',4,4'-tetraaminodiphenyl sulfone. The preferred aromatic tetraamine is 3,3',4,4'-tetraaminobiphenyl.

The dicarboxylic component of this invention is defined by the formula:

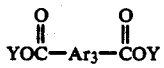

in which $Ar_3$ may be any of the divalent aromatic radicals identified previously such as m-phenylene and p-phenylene, 4,4'-,3,3'- and 2,2'-biphenylene, and 1,6- and 2,6-naphthylene and the Y's may be hydrogen, aryl or alkyl and may be the same or different. The dicarboxylic component may therefore be a free acid, diester and/or monoester; a mixture of diester(s) and/or monoester(s); or a single dialkyl ester, monoester or mixed aryl-alkyl or alkyl/alkyl ester. When Y is alkyl, it preferably contains 1 to 5 carbon atoms and is most preferably methyl. When Y is aryl, it may be any monovalent aromatic group obtained by filling with hydrogen all the valences but one of the aromatic groups which may be any of the Ar groups disclosed previously, either unsubstituted or substituted with any inert monovalent radical such as an alkyl or alkoxy containing 1 to 5 carbon atoms. Examples of such aryl groups are phenyl, naphthyl, the three possible phenylphenyl radicals and the three possible tolyl radicals. The preferred aryl group is usually phenyl.

Dicarboxylic acids which are suitable in free or esterified form as the aromatic dicarboxylic component are for example, the following: isophthalic acid; terephthalic acid; 4,4'-biphenydicarboxylic acid; 1,4-naphthalene-dicarboxylic acid; diphenic acid (2,2'-biphenyldicarboxylic acid); phenylindandicarboxylic acid; 1,6-napthalenedicarboxylic acid; 2,6-naphthalenedicarboxylic acid; 4,4--diphenyletherdicarboxylic acid; 4,4'-diphenylsulfonedicarboxylic acid; and 4,4'-diphenylthioetherdicarboxylic acid. Isophthalic acid is the dicarboxylic acid which in free or esterified from is most preferred for use in the process of the present invention.

A new class of polymers contemplated to be produced in accordance with this invention are benzimidazole/aromatic amide copolymers by polymerizing an aromatic diamine, an aromatic tetraamine and a stoichiometric amount of an aromatic dicarboxylic component, all as hereinbefore defined. The polymerization yields a polymer having two types of recurring structural units occurring randomly in the polymer chain, one containing two aromatic amide groups which may be the same or different and the other containing two benzimidazole groups which may or may not share a benzene or other carbocyclic aromatic ring. The reaction is shown by the following equation:

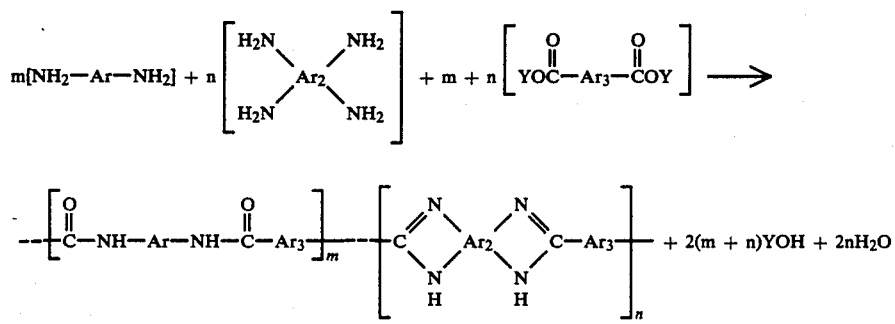

The ratio of m to n is directly proportional to the mol percent of diamine and tetramine in the aromatic amine component. In most cases, the amount of the tetraamine in the aromatic amine component will be in the range of 5 to 95 mol percent preferably 35 to 75 mol percent with the remainder being the diamine.

A preferred example of the foregoing class of benzimidazole/aromatic amide copolymer is 2,2'-(m-phenylene)-5,5'-bibenzimidazole/m-phenylene isophthalamide copolymer produced by copolymerizing m-phenylene diamine, 3,3',4,4'-tetraaminobiphenyl and a stoichiometric amount of isophthalic acid or an ester thereof. This reaction proceeds in accordance with the following equation:

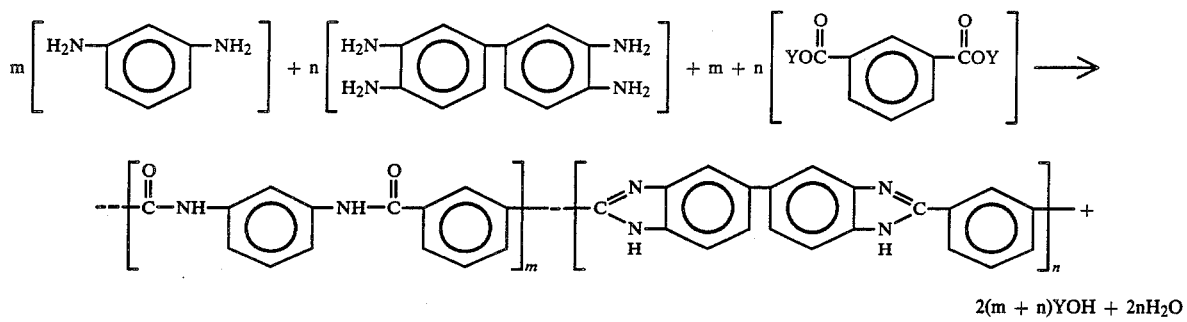

$$2(m + n)YOH + 2nH_2O$$

Another new class of polymers included within this invention are those produced by polymerizing an aromatic component consisting of a mixture of an aromatic triamine and an aromatic tetraamine with a stoichiometric amount of an aromatic dicarboxylic component, all as hereinbefore defined. The polymer resulting from this type of polymerization contains two types of randomly occurring recurring structural units, one containing a benzimidazole and an aromatic amide group and the other containing two benzimidazole groups which may or may not share a benzene or other carboxylic aromatic ring. The polymerization proceeds in accordance with the following equation:

with the remainder being aromatic triamine. A preferred polymer of this class is 2-(m-phenylenecarbonamide)-5-(p-phenylene) benzimidazole/2,2'-(m-phenylene)-5,5'-bibenzimidazole copolymers produced by polymerizing 3,4,4'-triaminobiphenyl, 3,3',4,4'-tetraaminobiphenyl and a stoichiometric amount of isophthalic acid or an ester thereof. This reaction may be represented by the following:

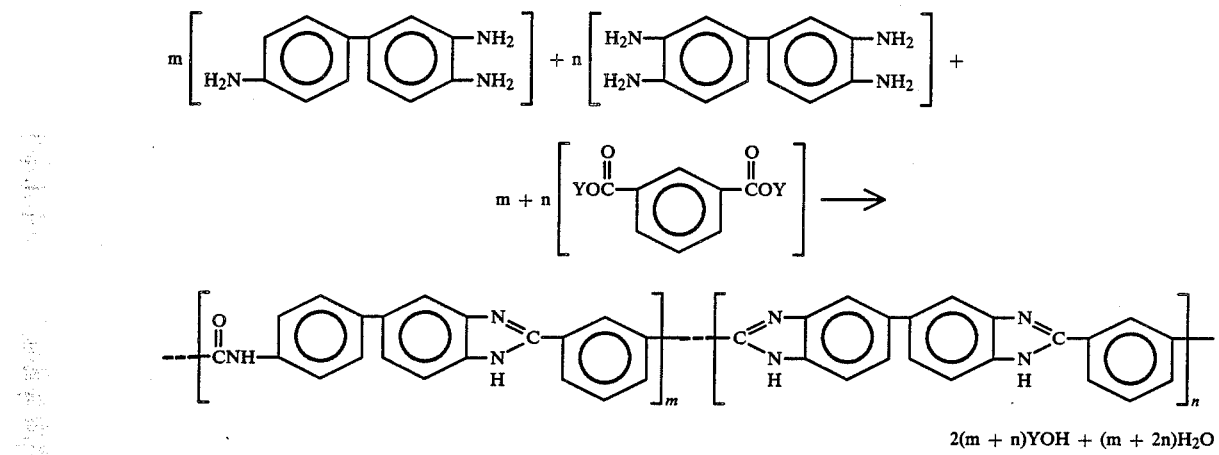

$$2(m + n)YOH + (m + 2n)H_2O$$

The process of this invention may also be used to produce wholly aromatic polyamides, the production of which by other processes is known in the art. These polymers are made by polymerizing equimolar amounts of an aromatic diamine with an aromatic dicarboxylic

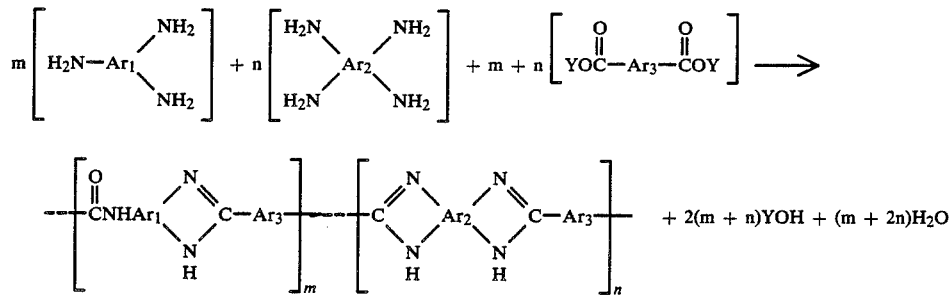

$$+ 2(m + n)YOH + (m + 2n)H_2O$$

where the units occur randomly in the polymer chain and the ratio of m to n is proportional to the mol percents of aromatic triamine and tetraamine respectively based on the total aromatic amine component. In this type of polymerization, the amount of tetraamine in the aromatic amine component may be for example, about 5 to 95 mol per, preferably about 50 to 95 mol percent, acid or ester thereof, all as hereinbefore defined. The type of polymerization results in a polymer having a single recurring structural unit containing two aromatic amide groups in which the divalent aromatic groups may be the same or different. The polymerization is shown by the following equation:

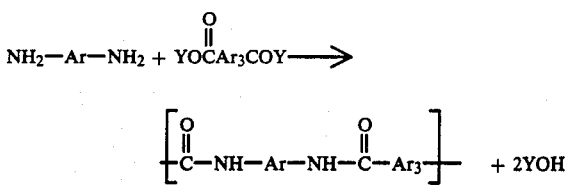

A preferred wholly aromatic polyamide is poly(m-phenylene)isophthalamide which is produced in accordance with the following equation:

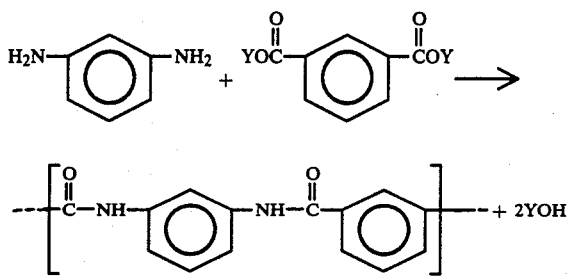

The polymerization process of this invention can be carried out without a catalyst. However, in accordance with another aspect of the invention, a catalyst is utilized, which in many cases has the effect of increasing inherent viscosity. Catalysts which may be used are, for example, phosphorus compounds such as triaryl phosphites and diaryl phosphites in which the aryl groups may be, for example, phenyl, tolyl and substituted phenyl wherein the substituents may be, for example, alkyl and alkoxy containing up to 4 carbon atoms, trialkyl phosphites wherein the alkyl groups contain up to 4 carbon atoms, triaryl phosphines wherein the aryl group may be phenyl, tolyl, naphthyl, fluorophenyl and methoxyphenyl, trialkyl phosphines, wherein the alkyl groups are propyl or butyl, halophosphines such as phenyldichlorophosphine, phosphorustrihalides, phosphorusoxy trihalides, magnesium, manganese and alkali methal hypophosphites, e.g. sodium hypophosphites, and triaryl phosphates, e.g. triphenyl phosphate; tin compounds such as m-butylstannoic acid, dibutyltin oxide, dibutyltin acetate, stannous chloride, stannic chloride, dibutyltin dilaurate, and stannous oxalate; silanes and siloxanes of the formula:

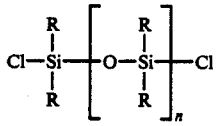

where R and R' may be the same or different and are methyl, phenyl or hydrogen and n is zero or an integer, e.g. up to 5, such as dimethyldichlorosilane, diphenyldichlorosilane, methylphenyldichlorosilane, and 1,3-dichloro-1,1,3,3-tetramethylsiloxane; organic sulfonic acids such as p-toluenesulfonic acid, benzenesulfonic acid, methanesulfonic acid, trifluoromethanesulfonic acid, and mixtures of the above, halogenated acetic acids as trifluoroacetic acid, and trichloroacetic acid, and mixtures of the above and non-oxidizing acids such as sulfuric acid, phosphoric acid, and hydrochloric acid. The preferred catalyst is triphenyl phosphite.

If a catalyst is employed, it is present in an amount, for example, of about 1 to 6 mole %, preferably about 2 to 4 mole % based on the total aromatic amine or aromatic dicarboxylic component.

The first stage of the process of the invention is carried out by heating the aromatic amine component, aromatic dicarboxylic component and catalyst, if used, with strong agitation to a temperature in the range of 230° to 350° C. and preferably 240° to 340° C. Depending on the melting point of the compounds of the aromatic dicarboxylic component and the chemical nature of the aromatic amine and the aromatic dicarboxylic components, the liquid mass being agitated will be a slurry, a homogenous mixture or an emulsion of two immiscible liquids. At some point after the initiation of polymerization as indicated by condensate evolution the agitation is discontinued and the mass heated further and in some cases, allowed to foam. In other cases the polymer does not foam but adheres and then spontaneously flies off the reactor walls. The point at which the agitation is discontinued depends upon the nature of monomers being polymerized. For example, when the aromatic dicarboxylic component is a diphenyl ester such as diphenyl isophthalate, the agitation may often be discontinued when condensate evolution begins. However, when the aromatic dicarboxylic component is a free acid such as isophthalic acid the discontinuance of agitation is generally at the point where the agitator torque and energy of agitation is at least about 150% but has not risen above, for example, about 1000% of the initial torque or agitation energy after the highest melting aromatic amine has melted, preferably not above about 300% such initial torque or agitation energy. The mass is then heated further without agitation to a temperature in the range, for example, of about 230° to 350° C., preferably about 280° to 390° C. Such heating is continued for a period of time in the range, for example, of about 0.25 to 3 hours and preferably about 0.5 to 1.5 hours. The mass is then cooled to a temperature below its melting point, e.g. room temperature which causes it to set up into a solid friable mass which is easily crushed or ground. In general, the inherent viscosity of the prepolymer after the first stage is complete is in the range, for example, of about 0.05 to 0.4 dl/g, (All inherent viscosities were measured from a solution of 0.4% by weight of polymer in 97% sulfuric acid at 25° C.).

The ground prepolymer is then further heated with normal agitation in a second stage at a temperature, for example, of about 300° to 420° C., preferably about 340° to 400° C. for a period, for example of about 0.25 to 4 hours, preferably about 0.5 to 2 hours until the desired degree of polymerization is attained. In many cases, the final polymer has an inherent viscosity of at least 0.45 dl/g.

When 2,2'-(m-phenylene)-5,5'-bibenzimidazole/m-phenylene isophthalamide copolymer is produced from m-phenylene diamine, 3,3',4,4'-tetraaminobiphenyl and an isophthalic component using the process of this invention, the first stage may be carried out at a temperature, for example of about 230° to 350° C., preferably about 280° to 340° C. for a period of time, for example of about 0.25 to 3 hours preferably 0.5 to 1.5 hours.

In both stages of the process of the present invention, a pressure is employed preferably equal to at least atmospheric pressure, e.g., one to two atmospheres, and preferably atmospheric pressure. Such a pressure is commonly obtained by employing an open polymerization system provided with a condenser in order to remove the compounds which are produced as by-products of the reaction.

Both stages of the process are conducted in a substantially oxygen-free atmosphere. For example, an inert gas such as nitrogen or argon can be continuously passed through the reaction zone during the polymerization. The inert gas employed should be substantially oxygen-free, i.e., contain less than about 20 p.p.m. of oxygen, preferably less than about 8 p.p.m., and more preferably, be oxygen-free. The inert gas is introduced into the reaction zone at a rate of flow measured at standard conditions, that is, atmospheric pressure and temperature, within the range of about 1 to 200 percent of the volume of the reaction zone per minute. The inert gas can be passed into the polymerization reaction zone at room temperature or, if desired, preheated to the reaction temperature.

The following examples further illustrate the invention. The inherent viscosities mentioned in the examples were measured as a 0.4% solution in 97% concentrated sulfuric acid at 25C and are expressed as decaliters per gram (dl/g) while the plugging values were measured by forming a 5% solution of the polymer in 97% sulfuric acid or a 6% solution in dimethyl acetamide (DMAc) containing 2% lithium chloride (LiCL) and filtering the solution at 25° C. and one atmosphere pressure through a Gelman Type A glass paper filter. The plugging value, which is the number of grams of polymer solution filtered per unit area in infinite time, is expressed in grams of polymer per square centimeter $(g/cm^2)$. A higher value indicates a polymer solution containing less gels and insolubles.

Examples 1 to 7 illustrate the process of this invention used to prepare new 2,2'-(m-phenylene)-5,5'-bibenzimidazole/m-phenylene isophthalamide copolymers by reacting a 3,3',4,4'-tetraaminobiphenyl (TAB) and m-phenylene diamine (mPDA) with a stoichiometric amount of diphenyl isophthalate (DPIP).

EXAMPLE 1

Into a three-necked, one-liter, round bottomed flask equipped with a nitrogen inlet and outlet, a mechanical stirrer and a condenser was placed 30.00 g (94.34 mmol) of diphenylisophthalate (DPIP) 15.14 g (70.75 mmol) of 3,3',4,4'-tetraaminobiphenyl (TAB) and (23.6 mmol) of meta-phenylenediamine (mPDA), for a DPIP:TAB:MPDA mol radio of 100:75:25. The flask was degassed and filled with nitrogen and the degassing was repeated at least three times. The flask was then heated with an oil bath at 350° C./hr to 270° C. Stirring was maintained at 60 rpm until condenstate evolution began, at which point agitation was terminated. Subsequently, the polymerizing mass foamed to fill the volume of the flask. The oil bath temperature was held at 270° C. for 90 minutes, after which the polymer was cooled, and the foam crushed. The ground prepolymer was then placed in a flask, the degassing cycles described above were repeated, and the prepolymer was heated with stirring at 60 rpm at 360° C. for 60 minutes. The flask was then cooled and the yellow powder removed from the flask. The resulting 2,2'-(m-phenylene)-5,5'-bibenzimidazole/m-phenylene isophthalamide copolymer exhibited an inherent viscosity (IV) of 0.66 dl/g (measured in 97% sulfuric acid at 0.4% solids concentration). The yield was 21 g (72.4 mmole) or 77%. The polymer was soluble at 6% solids in DMAc/2% LiCl.

EXAMPLE 2

A copolymer similar to that of Example 1 was prepared according to the procedure described in Example 1 except that 10.09 g (47.17 mmol) TAB and 5.09 g (47.2 mmol) mPDA was used for a DPIP:TAB:mPDA mol ratio of 100:50:5. The first-stage IV of the polymer was 0.27 while the second-stage IV was 0.62 dl/g. The isolated yield was 12.2 g. (44.7 mmol) or 47%.

EXAMPLE 3

The procedure of Example 2 was followed except that the first stage temperature was 300° C., and the second stage temperature was 340° C. The second-stage IV of the polymer was 0.48 while the plugging value (PV) measured in DMAc/LiCl was over 7. The yield was 29.87 g or 89.7%.

EXAMPLE 4

The procedure of Example 3 was followed except that 2% molar triphenyl phosphite (TPP) (based on DPIP) was added to the flask with the reactants. The second-stage polymer had an IV of 0.76 and a PV of over 7. The yield was 33.17 g or 99.6% based on DPIP.

EXAMPLE 5

The procedure of Example 3 was followed except that 6.73 g (31.41 mmol) of TAB and 10.19 g (94.23 mmol) of mPDA were used for a DPIP:TAB:mPDA mol ratio of 100:25:75. The second-stage polymer had an IV of 0.54 and PV of over 7. The yield was 24.0 g of 77.2%.

EXAMPLE 6

The procedure of Example 5 was followed except that 2% molar TPP was added to the flask with the reactants. The second-stage polymer had an IV of 0.51 and a PV of over 7. The yield was 15.11 g or 48.6%.

EXAMPLE 7

The procedure of Example 5 was followed except that 8.66 g (80.08 mmol) of mPDA were used for a DPIP:TAB:mPDA mol ratio of 15:85:100. The second-stage polymer had an IV of 0.66 and a PV of over 7. The yield was 14.89 g or 63.6%.

Examples 8 and 9 illustrate the preparation of copolymers of the same polymerized units as Examples 1 to 7 using isopthhalic acid rather than diphenyl isophthalate as the aromatic dicarboxylic component.

EXAMPLE 8

Into a three necked, one-liter, round bottomed flask equipped with a nitrogen inlet and outlet, a mechanical stirrer and a condenser was placed 16.60 g (100.1 mmol) of isophthalic acid (IPA), 10.70 g (50.00 mmol) of TAB, 5.40 g (50.0 mmol) of mPDA, and 150 g triphenyphosphite (5 mol% based on IPA). The IPA:TAB:mPDA ratio was 100:50:50. The flask was degassed and filled with nitrogen and the degassing was repeated at least three times. The flask was then heated with an oil bath at 350° C./hr to 300° C. Stirring as maintained at 300 rpm until condensate evolution began to slow and the torque increased to 90-100 mv from a value before viscosity increase of 30 mv. The oil bath temperature was held at 300° C. for one hour during which time the foam height in the flask increased to 6 cm. from an initial height of reactants in the flask of approximately 1 cm. The oil bath was cooled, and the foam crushed. The ground prepolymer was placed in a flask, the degassing cycles described above were repeated, and the prepolymer was heated with stirring at 60 rpm at 380° C. for 2 hours. The flask was then cooled and the dark brown powder removed from the flask. The resulting copolymer exhibited an inherent viscosity (IV) of 0.38 dl/g. The yield was 19.6 g (71.5 mmol) or 72%. The polymer was soluble at 6% solids in DMAc/2% LiCl.

EXAMPLE 9

The procedure of Example 8 was followed except that a 75:25 mol% ratio of TAB:mPDA was used. The weights were 16.60 g (100.0 mmol) IPA, 16.07 g (75.08 mmol) TAB, and 2.72 g (25.2 mmol) mPDA. The resulting first stage polymer had an IV of 0.16 dl/g. The resulting second stage polymer had an IV of 0.47 dl/g and a DMAc PV of 0.17. The isolated yield was 25.7 g (88.3 mmol) or 88%.

Examples 10 to 14 illustrate the separation of new 2-(m-phenylene carbonamide)-5-(p-phenylene) benzimidazole/2,2'-(m-phenylene)-5,5,'-bibenzimidazole copolymers by reacting 3,3',4,4'-tetraaminobiphenyl (TAB) and 3,4,4'-triaminobiphenyl (TRI) with a stoichiometric amount of diphenyl isophthalate (DPIP).

EXAMPLE 10

The procedure of Example 1 was followed except that TAB (10.12 g, 47.29 mmol), TRI (99.39 g, 47.2 mmol), and DPIP (30.00 g, 94.34 mmol) were combined in the flask, for a TAB:TRI:DPIP ratio of 50:50:100. The first-stage polymer had an IV of 0.22 dl/g, the second-stage polymer had an IV of 0.46 dl/g, the second-stage PV of the polymer measured in sulfuric acid was 1.7 g/cm$^2$ and the polymer yield was 26.6 g of 92%.

EXAMPLE 11

The procedure of Example 10 was followed except that 15.15 g (70.79 mmol) of TAB and 4.69 g (23.56 mmol) of TRI was used for a TAB:TRI:DPIP ratio of 75:25:100. The first-stage IV was 0.20 dl/g., the second-stage IV was 0.54 dl/g. and the second-stage PV measured in sulfuric acid was 1.3 g/cm$^2$. The yield was 25.7 g or 88%.

EXAMPLE 12

The procedure of Example 10 was followed except that 18.17 g (84.91 mmol) of TAB and 1.88 g (9.45 mmol) of TRI was used for TAB:TRI:DPIP ratio of 90:10:100. The first-stage IV was 0.23 dl/g, the second-stage IV was 0.60 dl/g, and the second stage PV in sulfuric acid was 0.4 g/cm$^2$. The yield was 26.8 g or 92%.

EXAMPLE 13

The procedure of Example 10 was followed except that 19.18 g (89.63 mmol) of TAB and 0.94 g (4.72 mmol) of TRI was used for a TAB:TRI:DPIP ratio of 95:5:100. The first-stage IV was 0.20 dl/g, the second-stage IV was 0.57 dl/g, and the second-stage PV in sulfuric acid was 0.3 g/cm$^2$. The yield was 26.9 g or 93%.

EXAMPLE 14

The procedure of Example 11 was followed except that 1.0 g (3.2 mmol) of triphenylphosphite was also added. The first-stage IV was 0.23 dl/g, second-stage IV was 0.76 dl/g, and the second-stage PV in sulfuric acid was 0.1 g/cm$^2$ and the yield was 27.3 g or 94%.

The polymers of Examples 10 to 14 have thermal properties in terms of loss of weight at temperatures up to 670° C. equivalent to a pure polybenzimidazole prepared by polymerizing stoichiometric quantities of TAB and an isophthalic component such as DPIP.

Examples 15 to 20 illustrate the preparation of wholly aromatic polyamides using the two stage melt polymerization process of this invention.

EXAMPLE 15

The procedure of Example 1 was followed except for the following: Stoichiometric amounts of DPIP (30.00 g, 94.34 mmol) and mPDA (10.19 g, 94.34 mmol) was used. The reactants were heated according to Example 1 except that the first stage was heated to 250° C. and held there for 5 minutes. The polymer did not foam, but tended to adhere to the reactor walls and then violently fly off the walls. After cooling and grinding the material, the IV was 0.07 dl/g. The material was then heated in a second stage reaction as described in Example 1 to 380° C. and held for 90 min. to give a poly(m-phenylene isophthalamide) with an IV of 0.25 dl/g and a PV in sulfuric acid of 0.63 g/cm$^2$.

EXAMPLE 16

The procedure of Example 15 was followed except that the temperature and holding time for the first stage were 290° C. and 1.5. hours and for the second stage 360° l C. and 1 hour. The poly(m-phenylene isophthalamide) had a first stage IV of 0.10, a second stage IV of 0.26 and a second stage PV in DMAc/LiCL of over 14 and was obtained in 97% yield.

EXAMPLE 17

The procedure of Example 16 was followed except that the DPIP replaced with diphenyl terephthalate (DPTP), and the first and second stage temperatures were 270° C. and 360° C. respectively. The resulting poly(m-phenylene terephthalamide) had a first stage IV of 0.10 and a second stage IV of 0.16 and was obtained in 98% yield.

EXAMPLE 18

The procedure of Example 16 was followed except that the mPDA was replaced with p-phenylenediamine (pPDA) and the first and second stage temperatures were 300° C. and 360° C. respectively. The resulting poly(p-phenylene isophthalamide) had a first stage IV of 0.14, and a second stage IV of 0.34 and was obtained in substantially 100% yield.

EXAMPLE 19

The procedure of Example 16 was followed except that the DPIP was replaced with DPTP and the mPDA with pPDA and the first and second stage temperatures were 300° C. and 360° C. respectively. The resulting poly(p-phenylene terephthalamide) had a first stage IV of 0.10 and a second stage IV of 0.14 and was obtained in substantially 100% yield.

EXAMPLE 20

The procedure of Example 19 was repeated except that triphenyl phosphite in an amount of 4 mol % based on the DPTP was added with the reactant. The resulting polymer had a first stage IV of 0.27, and a second stage IV of 0.54 and was obtained in substantially 100% yield.

The polymers of this invention may be formed into shaped articles such as fibers and films using shaping techniques well-known in the art for wholly aromatic polyamides such as poly(m-phenylene isophthalamide) sold under the trademark "Nomex" or poly(p-phenylene terephthalamide) sold under the trademark "Kevlar" and polybenzimidazoles sold commercially by Celanese Corporation.

In fiber form the polymers of this invention may be used for high temperature heat and electrical insulation, protective clothing and curtains, filtration media, packing and gasketing materials, brake linings and clutch facings. In the aircraft industry these materials can be used in parachutes, fuel cells, tires, ducts, hoses and insulation. Cordage for tires and conveyor belts, particularly where such materials would be subject to prolonged high temperature exposure is another application. Press cloths in the dry cleaning industry prepared from such fibers have extreme hydrolytic stability. In the form of films, these polymers may be used in automotive and aviation interior head lining materials, decorative trim, high temperature heat and electrical insulation, such as for slot liners, used in dry transformers, capacitors, cable wrappings, etc., packaging of items to be exposed to high temperature radiation while within the package, corrosion, resistant pipe, hot water pipe, duct work, hot air ventilation, aircraft body skins, aircraft radomes, embossing roll covers, containers and container linings, printed circuits, tape for hot pipe overwrapping, laminated structures where the films are bonded to metal sheets or foils, mold liners, or self-sustaining containers for casting low-melting (below 300° C.) fusible materials, including metals and a variety of other similar and related uses.

I claim:

1. A two stage process for producing a polymer containing aromatic amide groups comprising heating with agitation in a first stage in a substantially oxygen-free atmosphere, a mixture of aromatic amine components comprising an aromatic tetraamine containing two pairs of amine groups each bonded to adjacent carbon atoms and at least one member of the group consisting of aromatic diamines in which the amine groups are bonded to non-adjacent hydrocarbon ring carbon atoms and aromatic triamines in which two amine groups are bonded to adjacent hydrocarbon ring carbon atoms and the third amine group is bonded to a hydrocarbon ring carbon non-adjacent to each of the other two amine grups, with an aromatic dicarboxylic component in free or esterified form, said heating being at least sufficient to bring the mixture to condensation polymerization temperatures, terminating the agitation while continuing to heat the reaction mass to maintain condensation polymerization temperatures but no higher than about 350° C. until the inherent viscosity of the polymerizing mass reaches at least 0.05 dl/g measured in concentrated sulfuric acid solution, cooling the mass to solidify it, crushing the mass to obtain a ground prepolymer and heating the ground prepolymer in a second stage in a substantially oxygen-free atmosphere at a temperature in excess of the highest temperature employed in said first stage with agitation until the desired inherent viscosity is obtained.

2. The process of claim 1 wherein said aromatic dicarboxylic component comprises a diphenyl ester of an aromatic dicarboxylic acid.

3. The process of claim 2 wherein said diphenyl ester is diphenyl isophthalate.

4. The process of claim 1 wherein said aromatic tetraamine is 3,3',4,4'-tetraaminobiphenyl.

5. The process of claim 1 wherein said aromatic amine component comprises a mixture of m-phenylene diamine and 3,3',4,4'-tetraaminobiphenyl and said aromatic dicarboxylic component is diphenyl isophthalate.

6. The process of claim 1 wherein said aromatic amine component comprises 3,4,4'-triaminobiphenyl and 3,3',4,4'-tetraaminobiphenyl and said aromatic dicarboxylic component is diphenyl isophthalate.

7. The process of claim 1 wherein said aromatic dicarboxylic component is a free aromatic dicarboxylic acid and said first stage heating is continued with agitation until the agitator torque is from about 1.5 to about 10 times the torque before the commencement of polymerization, prior to said termination of agitation.

8. The process of claim 7 wherein said free aromatic dicarboxylic acid is isophthalic acid.

9. The process of claim 1 wherein a catalyst for the reaction is employed.

10. The process of claim 9 wherein said catalyst is triphenyl phosphite.

11. As new compositions of matter, 2,2'-(m-phenylene)-5,5'-benzimidazole/m-phenylene isophthalamide copolymers.

12. As new compositions of matter 2-(m-phenylenecarbonamide)-5-(p-phenylene)benzimidazole/2,2'-(m-phenylene)-5,5'-bibenzimidazole copolymers.

13. The copolymers of claim 11 having an inherent viscosity of at least 0.1 dl/g measured in concentrated sulfuric acid.

14. The copolymers of claim 12 having an inherent viscosity of at least 0.1 dl/g measured in concentrated sulfuric acid.

* * * * *